United States Patent [19]

Wiser

[11] Patent Number: 5,131,695
[45] Date of Patent: Jul. 21, 1992

[54] COUPLING WITH TEFLON SEAT

[75] Inventor: Herman D. Wiser, Buda, Tex.

[73] Assignee: Chatleff Controls, Inc., Buda, Tex.

[21] Appl. No.: 668,972

[22] Filed: Mar. 13, 1991

[51] Int. Cl.⁵ .............................................. F16L 17/06
[52] U.S. Cl. ....................................... 285/354; 285/910
[58] Field of Search ............ 285/354, 353, 910, 918, 285/166, 349, 350

[56] References Cited

U.S. PATENT DOCUMENTS

| | | | |
|---|---|---|---|
| 2,537,249 | 1/1951 | Walton | 285/354 X |
| 2,880,019 | 3/1959 | Wurtz et al. | 285/353 X |
| 3,092,404 | 6/1963 | MacWilliam | 285/354 X |
| 3,124,502 | 3/1964 | Radke | 285/910 |
| 4,622,732 | 11/1986 | Broderick | 285/354 |

FOREIGN PATENT DOCUMENTS

| | | | |
|---|---|---|---|
| 383217 | 10/1923 | Fed. Rep. of Germany | 285/168 |
| 1372210 | 8/1964 | France | 285/918 |
| 449272 | 6/1936 | United Kingdom | 285/354 |

*Primary Examiner*—Dave W. Arola
*Attorney, Agent, or Firm*—Arnold, White & Durkee

[57] ABSTRACT

A reusable union coupling is provided, particularly for refrigeration service, comprising two fittings, a body and an adapter, which are attached to the two conduits or other components to be joined. A variable washer seal cavity is created when the body and adapter are mated, within which a teflon washer is disposed. Means are provided for moveably connecting the body to the adapter and selectively compressing the washer within the cavity, in particular a rotatable collar is provided which engages the adapter and threads onto the body. Means are also provided to prevent extrusions, displacement, and over-compression of the washer.

12 Claims, 2 Drawing Sheets

COUPLING WITH TEFLON SEAT

BACKGROUND OF THE INVENTION

1. Field of the Invention

The invention provides an improved connection for sealably joining the ends of two conduits. More particularly, the invention relates to a leakproof union coupling for use in connecting conduits used in refrigeration systems.

2. Description of the Prior Art

Refrigeration systems may typically include several components, such as compressors, condensers, heat exchangers, and valves, which must be connected together in a way that effectively seals the interior of the refrigerant circulating system from the environment around it. Refrigerants, such as freon, which are introduced into such systems as the working fluid, are expensive, hazardous to the environment, and sometimes toxic, and it is therefore critical that a closed circulating system of a refrigeration system be effectively sealed to prevent escape of the fluid or gas.

Sealing of a refrigeration system is often complicated by the fact that various portions of a system are simultaneously hot and cold, and may be operated under a high pressure and a vacuum, and vibration is often a factor. Also, the common refrigerant fluids may be incompatible with many common sealing materials, and specialized materials such as polytetrafluoroethylene (Teflon) must be used.

It is often desirable that a connection between two components of a refrigeration system be easily disconnectable, so that installation and replacement of a component may be accomplished without the use of heat connecting methods or extensive tools. It is also desirable that the connection be accomplished by abutting the ends of two fixed conduits and sealably joining them, without rotating either conduit. Connections known as "unions" are common in plumbing and other pipefitting arts, which employ a rotatable collar to connect abutting ends of conduits, where the ends have been previously fitted with appropriate hardware. The typical union may be repeatedly connected and disconnected by rotating the collar.

A typical union believed to partially satisfy the demanding requirements of refrigeration service, able to withstand the heat, cold, pressure, vacuum, vibration and exposure to refrigerant, was described in U.S. Pat. Nos. 2,934,915 and 3,091,945 in the late 1950's and continues to be used, incorporated into a "Rotalock" valve made by Primore Sales, Inc. of Adrian, Mich.

The Rotalock union establishes an effective seal with relatively little torque applied to the collar by providing two sealing surfaces which are held together by the collar. To effectuate an adequate seal, one of the sealing surfaces has an annular rib extending from it, while the other sealing surface has a complementary groove. In an early version, a malleable metal washer was positioned between the sealing surfaces and deformed by the rib/groove combination, providing a gas tight seal with the collar hand tightened.

Later versions, including one in use today, use a plastic ring placed in the groove. When the collar is tightened, it draws the rib into the plastic ring while the groove limits deformation of the ring, providing a high pressure seal.

The Rotalock union appears to exhibit several disadvantages, however. First, its components are believed to be relatively difficult and therefore expensive to fabricate, particularly the critical rib on the one side and groove on the other. These are typically rather small features that must be machined with precision. Second, its components also appear to be possibly subject to damage, again particularly the rib extending from one of the sealing surfaces. Third, if the rib is fully depressed into the plastic ring each time the connection is tightened, it appears that the ring may become indented or eroded to the point that the rib will no longer press into the ring with adequate force around the complete circle. A leak therefore might develop that would be correctable only by disassembling the union and replacing the ring, a process that may involve loss of refrigerant and increased costs.

SUMMARY OF THE INVENTION

The disadvantages discussed above are in large part solved by the device and method of the present invention. That is, the coupling of the present invention has the same number of parts as the prior art coupling, but is simpler and less expensive to fabricate and requires a smaller amount of material while attaining high leak integrity. Due to the relative simplicity of the geometry of the present invention, susceptibility to damage is reduced: for example, the critical surfaces are the sides of concave grooves which are protected by, rather than protruding from, the surrounding structure.

Also, the union of this invention is not intended to be tightened to a metal-to-metal seal. Instead, it is tightened sufficiently to compress the washer and achieve a leak-tight seal, and can be tightened further if needed due to erosion or deformation of the washer, or if a leak is observed during operation. Over-compression of the washer, however, is prevented by the metal-to-metal stop to prevent destruction of the washer by overtightening.

The present invention is a reusable union coupling designed for refrigeration service that includes four parts, a body, an adapter, a collar, and a washer. The body and the adapter are connected to the two components, typically two conduits, to be joined by the union. The body and adapter have complementary sealing grooves, with annular sealing surfaces generally perpendicular to the axis of the assembly. The sealing surface on the body corresponds with and faces the sealing surface on the adapter. A washer is compressed between the sealing surfaces to effectuate a leak proof seal. Each groove also has a cylindrical retention surface generally perpendicular to the corresponding sealing surface. In a preferred embodiment, the body retention surface faces inwardly and is adjacent to the outside edge of the body sealing surface, and the adapter retention surface faces outwardly and is adjacent to the inside edge of the adapter sealing surface. When the body and adapter are mated, the sealing and retention surfaces create an annular variable seal cavity with a substantially square or rectangular cross-section. A washer is placed within the cavity, confined between the sealing and retention surfaces. The retention surfaces control radial deformation of the washer when it is compressed between the sealing surfaces.

To prevent overtightening of the assembly, which could result in premature damage to the washer, a stop shoulder is provided on the adapter and positioned such that it is contacted by a portion of the body before the sealing surfaces can contact each other.

Means are supplied for connecting the body and adapter in the desired relation to compress the washer and form a leak-tight seal. In a preferred embodiment, the connecting means comprises a collar with an internally extending ring which engages the stop shoulder on the adapter while the collar is rotated to engage its internal threads with external threads on the body. As the collar rotates further the sealing grooves engage and the sealing surfaces approach one another. This collar may often be sufficiently tightened by hand without the use of tools to provide a leak-proof connection, and it may be tightened further with tools to provide a more secure connection. Under normal circumstances there is no metal-to-metal seal in the union, and any leaks discovered after pressurization of the system can be remedied by rotating the collar to compress the washer further.

Other connecting means may be utilized in place of the threaded collar described above. For example, flanges can be connected to the body and the adapter, and means for selectively positioning the flanges in parallel relation may be provided, e.g. a plurality of bolts equally spaced around the assembly.

For refrigeration purposes, one preferred material for the washer is polytetrafluoroethylene (Teflon) with up to 25% glass fiber by weight. It has been found that such a washer with, for example, 15% glass fiber is substantially indestructible when used in this invention, and is generally suitable for re-use.

The present invention therefore provides an improved coupling which allows connection of abutting conduits in a refrigeration system with a substantially leak-proof seal, which is believed to be more economical than the prior art, more resistant to damage during handling than the prior art, and capable of being further tightened after initial installation to remedy leaks which become apparent during operation of the system. These and other advantages of the present invention will be further appreciated from the drawings and from the detailed description provided below.

BRIEF DESCRIPTION OF THE DRAWINGS

So that the manner in which the herein described advantages and features of the present invention, as well as others which will become apparent, are attained and can be understood in detail, more particular description of the invention summarized above may be had by reference to the embodiment thereof which is illustrated in the appended drawings, which drawings form a part of this specification.

It is to be noted, however, that the appended drawings illustrate only exemplary embodiments of the invention and are therefore not to be considered limiting of its scope, for the invention may admit to other equally effective embodiments.

FIG. 3 is a cross-sectional view of another preferred embodiment of the present invention.

DETAILED DESCRIPTION OF A PREFERRED EMBODIMENT

Figure 1:
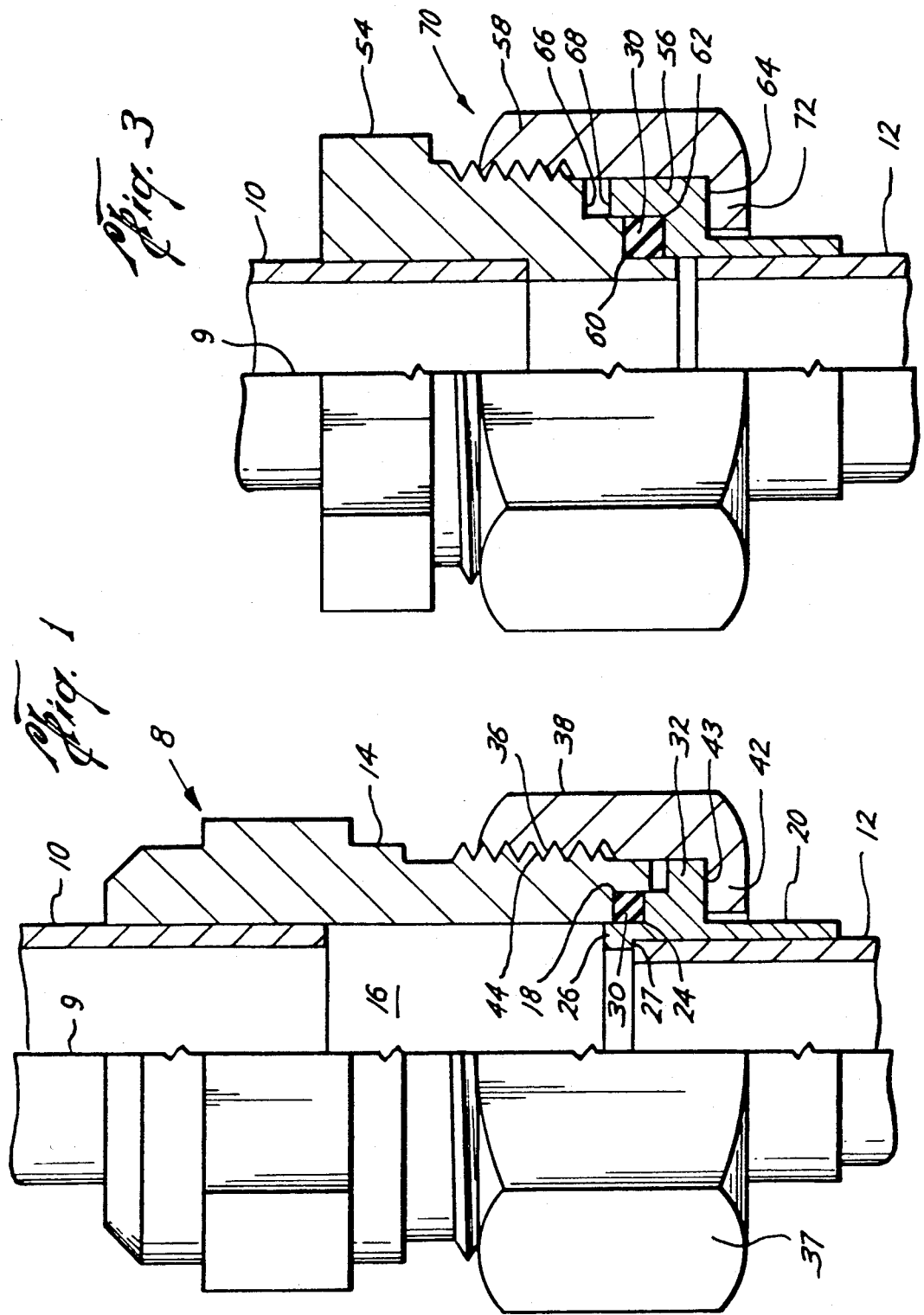
FIG. 1 is a partial cross-sectional view of a preferred embodiment of the present invention.

Turning now to FIG. 1, a reusable coupling 8 made in accordance with the present invention includes body 14, adapter 20, collar 38, and washer 30, which are used to removably and sealably connect a first conduit 10 to a second conduit 12. First conduit 10 and second conduit 12 are typically generally cylindrical, thin wall conduits, but any fluid carrying conduits may be joined with the present invention. Conduits 10, 12 are positioned substantially parallel and coaxial with respect to one another for connecting. The first end (shown in figures at the top of the page) of body 14 may be permanently sealingly fitted to the end of first conduit 10 while adapter 20 may be permanently sealingly fitted to the end of second conduit 12. This fitting may be accomplished in both cases by slidably inserting the respective conduits into the body and the adapter and soldering or brazing them in place. Alternatively, the body and adapter can be joined to the respective conduits in any conventional manner, for example, such as threaded. The leading end 26 of adapter 20 is shown with a small inwardly facing lip 27 which aids in properly positioning second conduit 12 fully into adapter 20. Body 10 has a generally cylindrical central channel 16 through which fluid can pass during operation of this coupling.

It can be seen in FIG. 1 that adapter 20 is held to body 14 by collar 38 which has an inwardly facing flange ring 42 at one end and internal threads 44 at the opposite end. The radially outward surface 37 of collar 38 may be hexagonal to accommodate manipulation with standard hand tools. Flange ring 42 engages collar retaining surface 43 of adapter 20 and is rotatable with respect thereto while collar threads 44 engage body threads 36. As collar 38 is rotated, adapter 20 is pulled into correct concentric alignment with body 14 and the leading end 26 of adapter 20 engages channel 16 of body 14. As collar 38 is rotated further the desired axial position of adapter 20 with respect to body 14 can be achieved.

In one preferred embodiment, the adapter, body, and collar may be all constructed of brass. In the preferred embodiment designed for connecting, for example, ⅜inch outside diameter conduits, the body may be manufactured from ⅞inch hexagonal stock, the collar may be manufactured from 15/16ths inch hexagonal brass stock, and the adapter may be manufactured from 11/16ths inch brass rod. The threads on the exterior of the body and the interior of the collar may be ⅜-20-2A.

Figure 2:
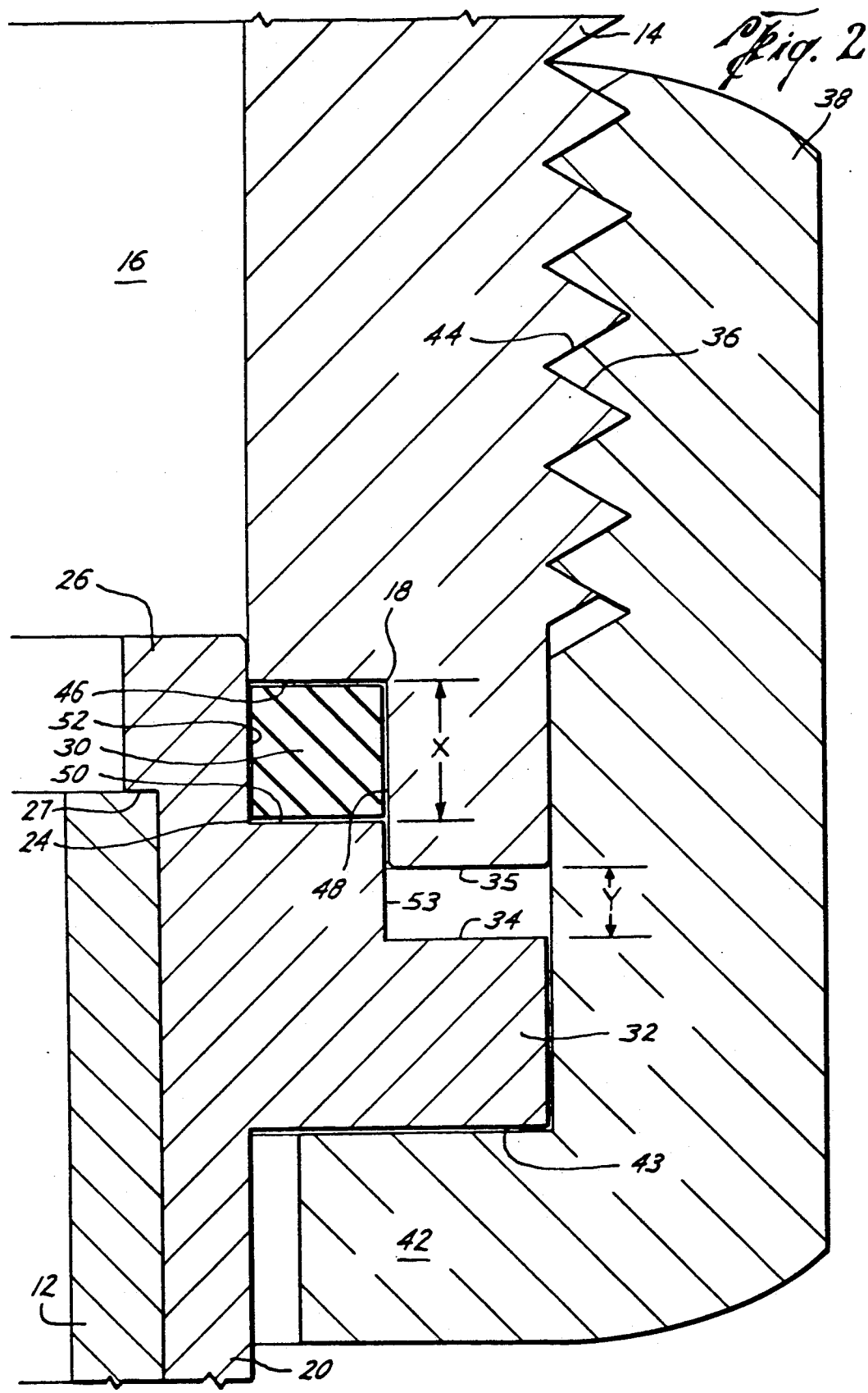
FIG. 2 is an enlarged cross-sectional view illustrating the sealing portion of the embodiment of FIG. 1.

FIG. 2 shows in enlarged form the details of the seal assembly between body 14 and adapter 20. Body 14 has internal annular sealing groove 18 which is defined by body sealing surface 46 and body retention surface 48. Adapter 20 includes external annular sealing groove 24 which is defined by adapter sealing surface 50 and adapter retention surface 52. Sealing surfaces 46 and 50 each lie in a plane generally perpendicular to the longitudinal axis 9 (see FIG. 1) of the coupling, and oppose each other in substantially parallel and spaced relationship as shown in FIG. 2. Body retention surface 48 is of cylindrical shape facing inwardly from the lower-most projection of the body structure while adapter retention surface 52 is cylindrical in shape facing outwardly from the upper-most portion of the adapter structure. When leading end 26 of adapter 20 is inserted into channel 16 of body 14, these four sealing and adapter surfaces 46, 48, 50, 52, form a variable washer seal cavity in which washer 30 is positioned and retained upon assembly. This cavity is variable in size in that adapter 20 may be moved axially (up and down in the figure) with respect to body 14 to selectively compress washer 30 within the cavity. The cavity is generally annular in shape and may be substantially square or rectangular in cross section.

In one preferred embodiment, designed for connecting, for example, ⅜ths inch conduits, washer 30 is generally circular with a substantially square cross section having sides approximately 0.05 inches in length. However, as can be appreciated, the square cross section of the variable seal cavity and washer 30 can be varied to include appropriate other shapes. For example, and without limitation, washer 30 may be circular, oblong or triangular in cross section. The seal cavity may also have various cross-sectional shapes which may function adequately for various washer shapes.

FIG. 2 also illustrates the relative position of the components with washer 30 in place but not significantly compressed, such that dimension X is approximately 0.05 inches, for example. In this position, there is some overlap between adapter retention surface 52 and the interior surface of body cavity 16 and also between the lower portion of body retention surface 48 and surface 53 of adapter 20. These overlaps may be constructed with close clearances of, for example, 0.002–0.003 inches in order to properly align body 14 and adapter 20 and to maintain washer 30 in place and to prevent its extrusion by overtightening.

Damage to washer 30 during installation or tightening is further prevented by the interaction of stop surface 34 of adapter flange 32 and bottom edge surface 35 of body 14. Body 14 and adapter 20 are constructed such that dimension Y in FIG. 2 is always less than dimension X in FIG. 2 by a pre-determined amount. In one preferred embodiment, designed for ⅜ths inch conduits, for example, and utilizing a substantially 0.05 inch thick washer 30, dimension Y may be, for example, substantially 0.025 inches less than dimension X. Therefore, for example, when dimension X is reduced to 0.025 inches due to wear of washer 30 or overcompression, dimension Y becomes zero, surfaces 34 and 35 contact one another and further compression of washer 30 is prevented. This feature prevents over-extrusion or destruction of washer 30 by overtightening and generally provides a leak tight seal even if the joint is over-tightened until metal-to-metal contact occurs.

Body 14 or adapter 20 may of course be connected directly to a vessel or apparatus rather than to a conduit. Similarly, body 14, rather than being adapted to be connected to a conduit, may be constructed as a cap (having channel 16 open only at the second end of body 14), a spray nozzle, a distribution junction, or any other desired device.

Turning to FIG. 3, a second embodiment 70 is illustrated. However, in this embodiment, body 54 uses an exterior annular sealing groove and adapter 56 has an interior annular sealing groove. The coupling is otherwise similar to that described above with identical elements and features including washer 30 contained in a variable annular sealing cavity formed by the surfaces of external annular sealing groove 60 and internal annular sealing groove 62. Compression of washer 30 is limited by contact between the upper edge 68 of adapter 56 and stop surface 66 of body 54. This contact will occur when washer 30 is compressed to, for example, approximately ½ its original thickness. Collar 58 again has an internal flange ring 72 which engages collar retaining surface 64 of adapter 56 and is rotatable with respect thereto. The other end of collar 58 has threads which engage the threads on the exterior of body 54.

In most embodiments, washer 30 can be constructed of any suitable material. In a preferred embodiment for refrigeration service polytetrafluoroethylene (Teflon) is preferred due to its high temperature resistance and its resistance to many refrigerants and oils. Glass fiber may be incorporated into Teflon for additional wear and use advantages including to prevent deformation and extrusion of washer 30 during tightening and use. It has been determined that, for the present use, up to at least 25% glass fiber is beneficial. In a preferred embodiment, for example, a Teflon washer with 15% glass fiber is effective, exhibiting little if any damage after intentional overtightening.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size, and arrangement of parts. For example, equivalent elements or materials may be substituted for those illustrated and described herein, and certain features of the invention may be utilized independently of the use of other features, all as would be apparent to one skilled in the art after having the benefit of this description of the invention.

What is claimed is:

1. A connector assembly comprising:
   a connector body with a first end and a second end having a central channel and an internal annular sealing groove formed adjacent the second end;
   an adapter having a central channel and an external annular sealing groove, said adapter and external sealing groove being dimensioned relative to the connector body and internal sealing groove such that a portion of the adapter and external groove are received within the central channel of the connector body, and the internal groove and the external groove mate to form a variable washer seal cavity;
   a washer disposed within the variable seal cavity for forming a sealed connection when the body and adapter are engaged;
   the adapter having an annular stop surface thereon, said stop surface positioned such that it contacts a portion of the connector body after the washer has exceeded its maximum intended compression; and
   means for movably connecting the connector body to the adapter and selectively positioning the external sealing groove with respect to the internal sealing groove to thereby vary the compression of the washer within the variable seal cavity.

2. A connector assembly comprising:
   a connector body with a first end and a second end having a central channel and an external annular sealing groove formed adjacent the second end;
   an adapter having a central channel and an internal annular sealing groove, said adapter and internal sealing groove being dimensioned relative to the connector body and external sealing groove such that a portion of the body and external groove are received within the central channel of the adapter, and the internal groove and the external groove mate to form a variable washer seal cavity;
   a washer disposed within the variable seal cavity for forming a sealed connection when the body and adapter are engaged;

the body having a stop surface thereon which is substantially normal to the central channel of the body, said stop surface positioned such that it contacts a portion of the adapter after the washer has exceeded its maximum intended compression; and means for movably connecting the connector body to the adapter and selectively positioning the external sealing groove with respect to the internal sealing groove to thereby vary the compression of the washer within the variable seal cavity.

3. The assembly of claim 1 or 2 wherein the body channel is open only at said second end.

4. A connector assembly for sealably connecting adjacent ends of a first and a second conduits comprising:

a connector body with a first end and a second end having its first end connected to the end of the first conduit and having a central channel, said body having an internal annular sealing groove formed adjacent the second end;

an adapter with a first adapter end and a second adapter end having the first adapter end connected to the end of the second conduit and having a central channel, said adapter having an external annular sealing groove formed adjacent the second adapter end, said adapter and external sealing groove being dimensioned relative to the connector body and internal sealing groove such that a portion of the second adapter end and external groove are received within the central channel at the second end of the connector body, and the internal groove and the external groove mate to form a variable washer seal cavity;

a washer disposed within the variable seal cavity for forming a sealed connection when the body and adapter are engaged;

the adapter having an annular stop surface thereon which is substantially normal to the central channel of the adapter, said stop surface positioned such that the stop surface contacts a portion of the connector body after the washer has exceeded its maximum intended compression; and means for movably connecting the connector body to the adapter and selectively positioning the external sealing groove with respect to the internal sealing groove to thereby vary the compression of the washer within the variable seal cavity.

5. The assembly of claim 4 wherein the end of the second conduit is slidably inserted into the central channel of the adapter and sealably connected thereto.

6. The assembly of claim 1, 2 or 4 wherein the washer is comprised of polytetrafluoroethylene.

7. The assembly of claim 6, wherein the washer further comprises glass fiber.

8. The assembly of claim 7, wherein the glass fiber content is up to 25 percent by weight.

9. The assembly of claim 1, 2 or 4 wherein the connecting means comprises a first flange connected to the body, a second flange connected to the adapter, and means for selectively positioning said flanges in parallel relation.

10. The assembly of claim 1, 2 or 4 wherein the connecting means comprises a generally cylindrical collar having internal threads adapted for engaging a threaded outer surface of the body, said collar also having an inwardly extending annular flange ring engaging a flange extending radially outward from the adapter.

11. A connector assembly comprising:

a connector body with a first end and a second end having a central channel and an internal annular sealing groove formed adjacent the second end;

an adapter having a central channel and an external annular sealing groove, said adapter and external sealing groove being dimensioned relative to the connector body and internal sealing groove such that a portion of the adapter and external groove are received within the central channel of the connector body, and the internal groove and the external groove mate to form a variable washer seal cavity;

a washer disposed within the variable seal cavity for forming a sealed connection when the body and adapter are engaged;

the adapter having an annular stop surface thereon, said stop surface selectively positioned such that it contacts a portion of the body when the washer is compressed to a preselected thickness of less than about .50 percent of its original uncompressed thickness; and means for movably connecting the connector body to the adapter and selectively positioning the external sealing groove with respect to the internal sealing groove to thereby vary the compression of the washer within the variable seal cavity.

12. A connector assembly comprising:

a connector body with a first end and a second end having a central channel and an external annular sealing groove formed adjacent the second end;

an adapter having a central channel and an internal annular sealing groove, said adapter and internal sealing groove being dimensioned relative to the connector body and external sealing groove such that a portion of the body and external groove are received within the central channel of the adapter, and the internal groove and the external groove mate to form a variable washer seal cavity;

a washer disposed within the variable seal cavity for forming a sealed connection when the body and adapter are engaged;

the body having a stop surface thereon which is substantially normal to the central channel of the body, said stop surface selectively positioned such that it contacts a portion of the adapter when the washer is compressed to a preselected thickness of less than about 50 percent of its original uncompressed thickness; and means for movably connecting the connector body to the adapter and selectively positioning the external sealing groove with respect to the internal sealing groove to thereby vary the compression of the washer within the variable seal cavity.

* * * * *

REEXAMINATION CERTIFICATE (2199th)
United States Patent [19]

Wiser

[11] B1 5,131,695

[45] Certificate Issued Jan. 18, 1994

[54] COUPLING WITH TEFLON SEAT

[75] Inventor: Herman D. Wiser, Buda, Tex.

[73] Assignee: Chatleff Controls, Inc., Buda, Tex.

Reexamination Request:
No. 90/003,064, May 13, 1993

Reexamination Certificate for:
Patent No.: 5,131,695
Issued: Jul. 21, 1992
Appl. No.: 668,972
Filed: Mar. 13, 1991

[51] Int. Cl.⁵ .................................... F16L 17/06
[52] U.S. Cl. ........................ 285/354; 285/910
[58] Field of Search ............. 285/353, 354, 166, 910, 285/918, 349, 350

[56] References Cited
PUBLICATIONS

Chatleff Controls, Inc., "Eliminator-Distributor Series 3853" brochure.
Chatleff Controls, Inc., "Eliminator-Distributor Series 3843" brochure.

*Primary Examiner*—Dave W. Arola

[57] ABSTRACT

A reusable union coupling is provided, particularly for refrigeration service, comprising two fittings, a body and an adapter, which are attached to the two conduits or other components to be joined. A variable washer seal cavity is created when the body and adapter are mated, within which a teflon washer is disposed. Means are provided for moveably connecting the body to the adapter and selectively compressing the washer within the cavity, in particular a rotatable collar is provided which engages the adapter and threads onto the body. Means are also provided to prevent extrusions, displacement, and over-compression of the washer.

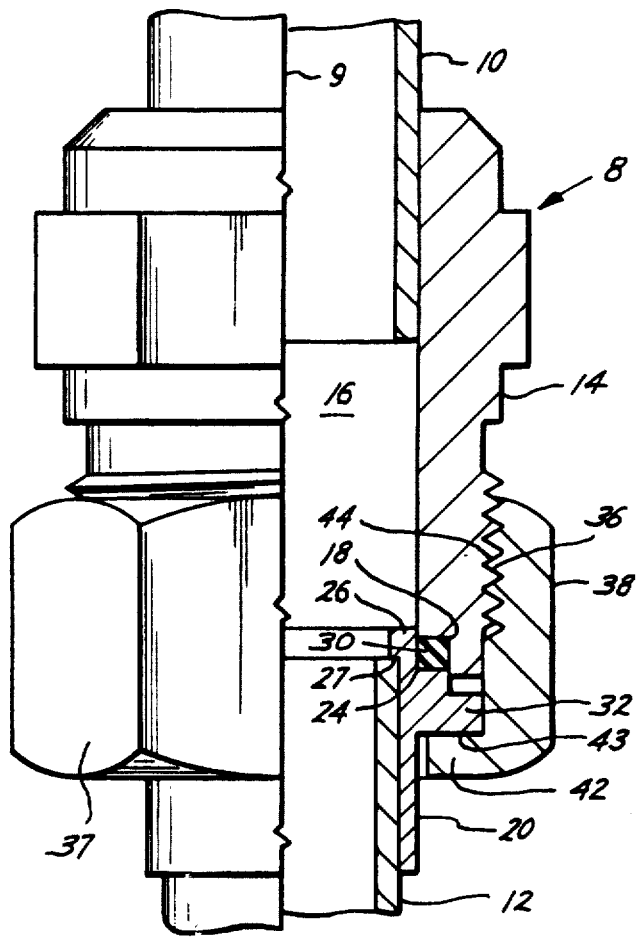

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 9 and 10 are cancelled.

Claims 1, 2, 4, 11 and 12 are determined to be patentable as amended.

Claims 3, 5-8, dependent on an amended claim, are determined to be patentable.

1. A connector assembly comprising:
   a connector body with a first end and a second end having a central channel and an internal annular sealing groove formed adjacent the second end;
   an adapter having a central channel and an external annular sealing groove, said adapter and external sealing groove being dimensioned relative to the connector body and internal sealing groove such that a portion of the adapter and external groove are received within the central channel of the connector body, and the internal groove and the external groove mate to form a variable washer seal cavity;
   a washer disposed within the variable seal cavity for forming a sealed connection when the body and adapter are engaged;
   the adapter having an annular stop surface thereon, said stop surface positioned such that it contacts a portion of the connector body after the washer has exceeded its maximum intended compression; and
   means for movably connecting the connector body to the adapter and selectively positioning the external sealing groove with respect to the internal sealing groove to thereby vary the compression of the washer within the variable seal cavity, *wherein the connecting means comprises a generally cylindrical collar having internal threads adapted for engaging a threaded outer surface of the body, said collar also having an inwardly extending annular flange ring engaging a flange extending radially outward from the adapter.*

2. A connector assembly comprising:
   a connector body with a first end and a second end having a central channel and an external annular sealing groove formed adjacent the second end;
   an adapter having a central channel and an internal annular sealing groove, said adapter and internal sealing groove being dimensioned relative to the connector body and external sealing groove such that a portion of the body and external groove are received within the central channel of the adapter, and the internal groove and the external groove mate to form a variable washer seal cavity;
   a washer disposed within the variable seal cavity for forming a sealed connection when the body and adapter are engaged;
   the body having a stop surface thereon which is substantially normal to the central channel of the body, said stop surface positioned such that it contacts a portion of the adapter after the washer has exceeded its maximum intended compression; and
   means for movably connecting the connector body to the adapter and selectively positioning the external sealing groove with respect to the internal sealing groove to thereby vary the compression of the washer within the variable seal cavity, *wherein the connecting means comprises a generally cylindrical collar having internal threads adapted for engaging a threaded outer surface of the body, said collar also having an inwardly extending annular flange ring engaging a flange extending radially outward from the adapter.*

4. A connector assembly for sealably connecting adjacent ends of a first and a second conduits comprising:
   a connector body with a first end and a second end having its first end connected to the end of the first conduit and having a central channel, said body having an internal annular sealing groove formed adjacent the second end;
   an adapter with a first adapter end and a second adapter end having the first adapter end connected to the end of the second conduit and having a central channel, said adapter having an external annular sealing groove formed adjacent the second adapter end, said adapter and external sealing groove being dimensioned relative to the connector body and internal sealing groove such that a portion of the second adapter end and external groove are received within the central channel at the second end of the connector body, and the internal groove and the external groove mate to form a variable washer seal cavity;
   a washer disposed within the variable seal cavity for forming a sealed connection when the body and adapter are engaged;
   the adapter having an annular stop surface thereon which is substantially normal to the central channel of the adapter, said stop surface positioned such that the stop surface contacts a portion of the connector body after the washer has exceeded its maximum intended compression; and
   means for movably connecting the connector body to the adapter and selectively positioning the external sealing groove with respect to the internal sealing groove to thereby vary the compression of the washer within the variable seal cavity, *wherein the connecting means comprises a generally cylindrical collar having internal threads adapted for engaging a threaded outer surface of the body, said collar also having an inwardly extending annular flange ring engaging a flange extending radially outwardly from the adapter.*

11. A connector assembly comprising:
    a connector body with a first end and a second end having a central channel and an internal annular sealing groove formed adjacent the second end;
    an adapter having a central channel and an external annular sealing groove, said adapter and external sealing groove being dimensioned relative to the connector body and internal sealing groove such that a portion of the adapter and external groove are received within the central channel of the connector body, and the internal groove and the external groove mate to form a variable washer seal cavity;

a washer disposed within the variable seal cavity for forming a sealed connection when the body and adapter are engaged;

the adapter having an annular stop surface thereon, said stop surface selectively positioned such that it contacts a portion of the body when the washer is compressed to a preselected thickness of less than about 50 percent of its original uncompressed thickness; and means for movably connecting the connector body to the adapter and selectively positioning the external sealing groove with respect to the internal sealing groove to thereby vary the compression of the washer within the variable seal cavity, *wherein the connecting means comprises a generally cylindrical collar having internal threads adapted for engaging a threaded outer surface of the body, said collar also having an inwardly extending annular flange ring engaging a flange extending radially outward from the adapter.*

12. A connector assembly comprising:

a connector body with a first end and a second end having a central channel and an external annular sealing groove formed adjacent the second end;

an adapter having a central channel and an internal annular sealing groove, said adapter and internal sealing groove being dimensioned relative to the connector body and external sealing groove such that a portion of the body and external groove are received within the central channel of the adapter, and the internal groove and the external groove mate to form a variable washer seal cavity;

a washer disposed within the variable seal cavity for forming a sealed connection when the body and adapter are engaged;

the body having a stop surface thereon which is substantially normal to the central channel of the body, said stop surface selectively positioned such that it contacts a portion of the adapter when the washer is compressed to a preselected thickness of less than about 50 percent of its original uncompressed thickness; and means for movably connecting the connector body to the adapter and selectively positioning the external sealing groove with respect to the internal sealing groove to thereby vary the compression of the washer within the variable seal cavity, *wherein the connecting means comprises a generally cylindrical collar having internal threads adapted for engaging a threaded outer surface of the body, said collar also having an inwardly extending annular flange ring engaging a flange extending radially outward from the adapter.*

* * * * *